July 15, 1969     W. A. TOTO     3,456,064
CONNECTORS FOR FLEXIBLE WELDING CABLE ASSEMBLIES
Filed Aug. 29, 1967     2 Sheets-Sheet 1
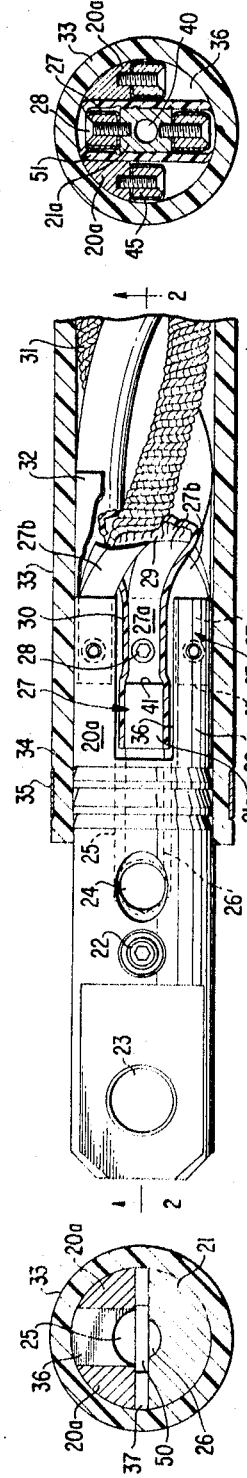
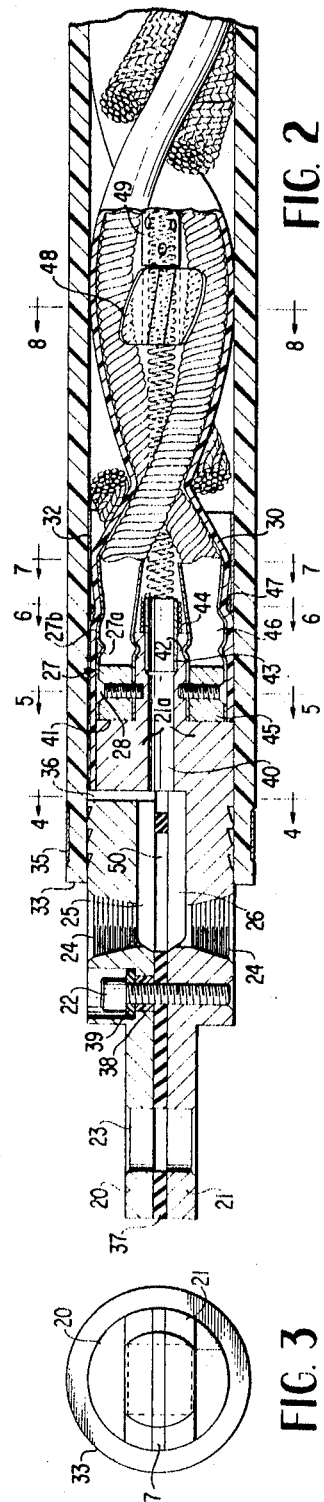
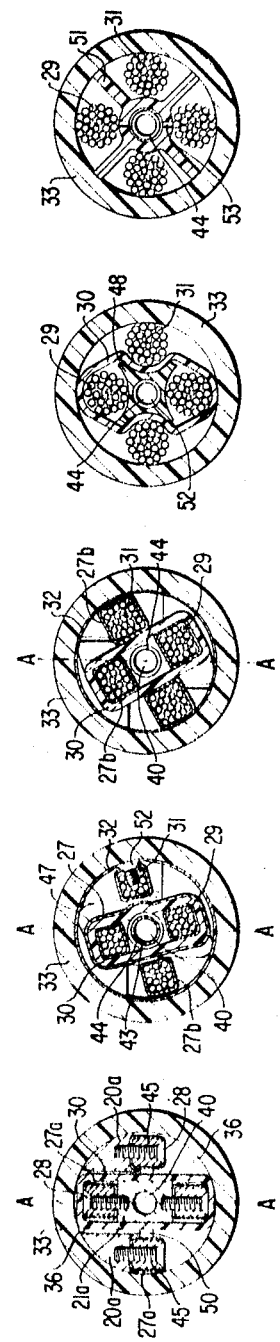
INVENTOR
WILLIAM A. TOTO
BY *Abraham A. Saffitz*
ATTORNEY July 15, 1969    W. A. TOTO    3,456,064
CONNECTORS FOR FLEXIBLE WELDING CABLE ASSEMBLIES
Filed Aug. 29, 1967    2 Sheets-Sheet 2
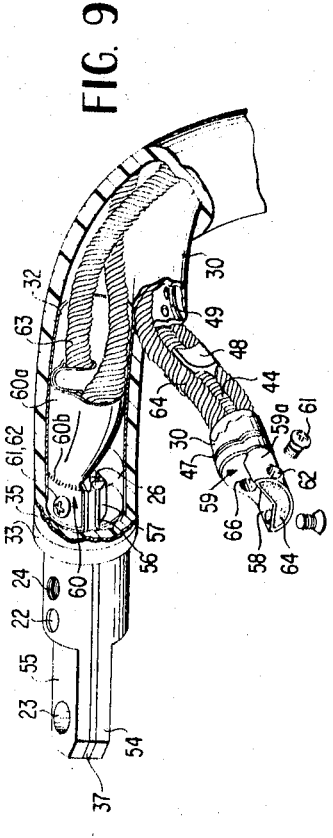
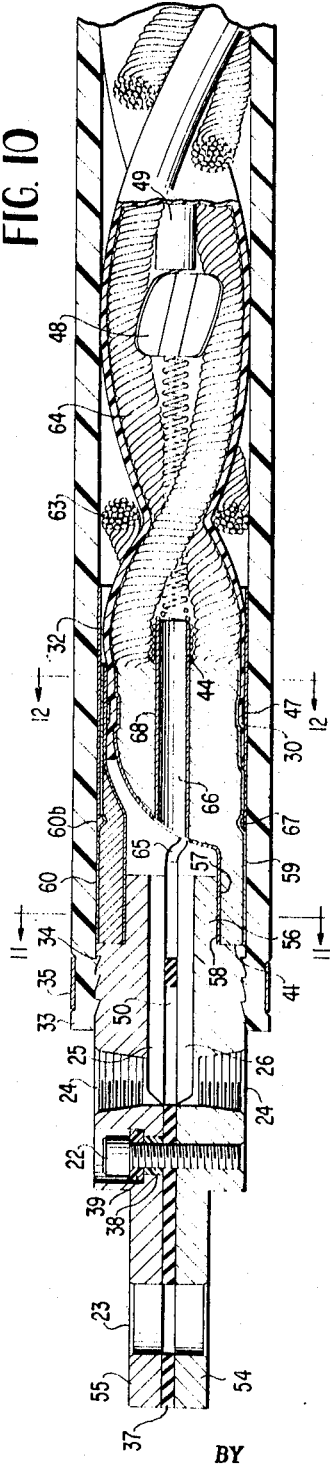
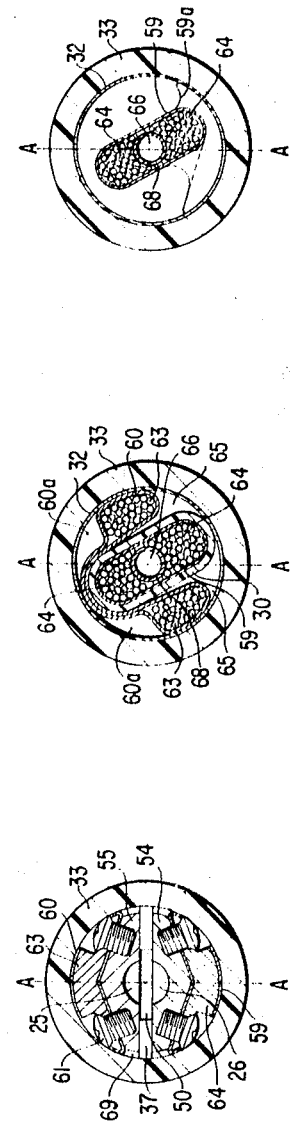
INVENTOR
WILLIAM A. TOTO
BY
ATTORNEY

United States Patent Office 3,456,064
Patented July 15, 1969

3,456,064
CONNECTORS FOR FLEXIBLE WELDING CABLE ASSEMBLIES
William A. Toto, 3645 Warrensville Center Road, Cleveland, Ohio 44122
Filed Aug. 29, 1967, Ser. No. 664,091
Int. Cl. H01b 7/34, 9/06
U.S. Cl. 174—15
6 Claims

ABSTRACT OF THE DISCLOSURE

A connector for connecting cables of like polarity to a corresponding conductor of a terminal structure, comprising a tubular structure having the rear cable receiving portion oriented or twisted with respect to the front portion secured to the conductor, the orientation being such that the rear portion is aligned with, or matches, the helix or lay of the cable connected thereto. Thus, the cable enters into, or emerges from, the connector, in a free manner, without kinking or bending at that region. A bearing sleeve encompasses the ends of all the connectors and the ends of the cables therein to further prevent kinking and bending of the cables of the assembly.

This invention relates to flexible cable welding assemblies, and more particularly to the connecting means between the cable ends and the rigid conductors of the terminal structure.

This invention embodies improvements over the cable assemblies disclosed and claimed in my prior Patents Nos. 3,127,467, 3,143,593, 3,333,044 and 3,340,346.

An object of this invention is to provide a connector for connecting cable ends of like polarity to the corresponding conductor of the terminal structure in a more economical and efficient manner than now practiced in the art.

Another object is to provide a connector which mechanically and electrically connects the cables to the terminal structure without the use of solder joints between the cables and the connectors.

A further object is to provide a tubular connector which is so oriented by suitably twisting its cable receiving end that it is aligned with the helix or lay of the cable assembly twist, whereby the cable end is freely received within the connector with a consequent reduction in kinking and bending strains on the cables.

A still further object is to provide a connector oriented as described above for receiving a single cable end.

Another object is to provide a connector which is oriented as described above for receiving a plurality of cables of the same polarity.

A further object is to provide a sleeve made of nylon, or similar material, to encompass the ends of all the connectors and a portion of the cables emerging therefrom, whereby the sleeve acts as a bearing and support for the cables, thereby preventing bending stresses on the cables, and kinking of the cables at that region, that is, where the cables enter the connectors.

For a fuller understanding of the nature and objects of the invention, reference may be had to the following detailed description and accompanying drawings in which:

FIGURE 1 is a fragmentary plan view, partly in section, of the improved terminal;

FIGURE 2 is a sectional view in part on a line 2—2 of FIGURE 1, and further shows the cable assembly and its connection to the terminal;

FIGURE 3 is an end view of the terminal;

FIGURE 4 and FIGURE 5 are sectional views taken on lines 4—4 and 5—5, respectively, of FIGURE 2;

FIGURE 5a is a view similar to that of FIGURE 5, but shows a modification;

FIGURES 6, 7 and 8 are sectional views taken on lines 6—6, 7—7 and 8—8 respectively, of FIGURE 2;

FIGURE 8a is a view similar to that of FIGURE 8, but shows a modification;

FIGURE 9 discloses a partly perspective view of a different embodiment of the invention, wherein a single connector connects a plurality of cables of like polarity to the corresponding conductor of the terminal;

FIGURE 10 is a longitudinal section of the cable assembly illustrated in FIGURE 9;

FIGURES 11 and 12 are sectional views taken on lines 11—11 and 12—12, respectively, on FIGURE 10; and FIGURE 12a is a view taken on sectional line 12—12 but omitting certain elements in order to show the orientation of the positive conductor more clearly.

The terminal structure is in many respects similar to the structure described in my above patents. The terminal comprises two mating conductors 20 and 21. For the purpose of explaining the invention only, conductor 20 is considered to be the negative conductor, and conductor 21, the positive conductor. For illustrating the invention, these conductors are designated in the several figures by minus and plus signs.

Conductors 20 and 21 are separated by insulating block 37 and these elements are secured together by a bolt 22, insulated from conductor 20 by insulating sleeves 38 and washer 39. The terminal structure is secured to the transformer or welding head by a fastening means passing through opening 23.

Conductors 20 and 21 are provided with threaded openings 24 for reception of cooling water connections. Water channels 25 and 26 are formed in the conductors and are in communication with each other through opening 50 provided in insulating block 37, as shown in FIGURE 2. Although the water circulating at opening 50 between the two conductor lugs might be supposed to constitute an electrical pathway between them, the conduction is insignificant as to its short circuiting effect because of the low voltage used and the high conductive path for the electric currents offered by the metal portions of the conductors and the cables attached thereto. In practice, the voltage used in the installation is 10 to 15 volts and the currents are extremely heavy and pass through copper conductors of very large cross sections. Under such conditions, the resistance of the water path is very high when compared to the resistance of the metal conductors, and the current leakage under the low voltage is negligible and has no operational effects.

Conductor 20 terminates in a bifurcated formation having extension 20a. Conductor 21 terminates in a single extension 21a located between extensions 20, as shown in FIGURE 5.

One feature of this invention is the twisted performed connector 27 for connecting a cable to a conductor, connector 27 being oriented to the twisted cable assembly to freely receive the end of a cable.

Connector 27 comprises a tubular structure having a squared forward end 27a and a diverging rear end 27b which is angularly offset or twisted from end 27a and so oriented that the twist matches the helix or lay of an individual cable of the cable assembly.

Each tubular conductor 27 receives the end of a cable. The cable assembly comprises a plurality of cables 29 and 31, which are twisted in a rope-like or helical manner well known in the art. For the purpose of illustration the cable assembly comprises four cables of which the two cables 29 may be considered to be of positive polarity and are connected to conductor 21. The other two cables 31 are of negative polarity and are connected to negative conductor 20. Cables 29 are insulated from cables 31 by a resilient sheath 30 made of plastic or similar material.

To overcome severe bending stresses at the ends of the connectors, usual at the welding gun end of the cable assembly, a nylon sleeve 32 encompasses the connectors and cable ends, as shown in FIGURE 1. Sleeve 32 provides a bearing surface and the proper amount of semi-rigidity to keep the assembly from kinking.

The assembly is covered by a sheath or hose element 33, running from terminal to terminal. The end of sheath 33 is fastened at the barb portion 34 of the terminal by clamp 35 to form a water tight joint. A passage means 36 is formed by the spacing between the extensions 20a and 21a of conductors 20 and 21 for passage of cooling water to the extensions 20a and around sheath 30, as shown in FIGURES 1, 2, 4 and 5.

Water channels 25 and 26 are in communication with water duct 40 in conductor 21. Duct 40 communicates with copper tube 43 which delivers the cooling water within sheath 30 to cool cable 29. A spring 44 extends from the end of tube 43 through sheath 30 and acts to deflect the water into flow engagement with the cables. It also acts as a spacer element.

The front portion 27a of a connector 27 is formed with a square end which abuts a corresponding surface 41 on the conductors 20 and 21 at their extensions 20a and 21a. To provide a better electrical contact the connector may be soldered at the abutting surfaces to the conductors. A screw 28 mechanically fastens each connector 27 to extensions 20a and 21 as shown in FIGURES 1, 2 and 5. The squared abutting surfaces 41 and screws 28 prevents the turning of the connectors and provides a positive connection between the connectors and the conductors. To additionally secure the connectors to the conductors, the connectors are dimpled at 42, which dimpled surfaces fit into corresponding shaped grooves in the conductor's extensions 20a and 21, as shown in FIGURE 2. A solid insert 45 is inserted at the forward end 27a of the connector to provide a better clamping action between the connector and the conductor by screws 28. Dimpled portions 42 also serve the function of aiding the securing of ends 46 of the several cables to the connectors. To secure a cable end 46 to respective connector 27, the end is fully inserted within the connector, as shown in FIGURE 2, and the tubular portion of the connector post insert 45 is swaged and crimped over the inserted end of the cable to form a good mechanical and electrical connection.

As shown in FIGURE 5, the positive connectors connected to cables 29 are bolted to extension 21a and the negative connectors connected to cables 31 are bolted to both extensions 20a.

The assembly is completed by wrapping waterproof cord 47 around sheath 30, the wrapping being held by the end of bearing sleeve 32. As will be noted from FIGURE 2, cord 47 is within the swaged regions of the connectors.

The invention particularly relates to a four cable assembly, although it is obvious that it may be practiced with any number of multi-cable assembly. The four cables are held in position by a fluted nylon bearing or separator 48. Bearing 48 holds the cables in their true position while the welding assembly is flexing during use. Bearing 48 also provides an aperature 52 (FIGURE 8) for passage of spring 44. Spring 44 combines into and through perforated resilient tubing 49 throughout the length of the cable assembly until it reaches the corresponding bearing 48 at the other end. Bearing 48 helps the cable strands to slide back and forth and the perforated tubing permits cooling water to flow around the cables regardless of any bending or twisting of the assembly.

The feature of the invention of orienting the twist of the rear portion 27b of a connector 27 to align with or match the rope lay or the helical twist of its connected cable of the welding assembly is illustrated in FIGURES 1, 5, 6 and 7. FIGURE 1 shows the general orientation of the twist of a connector's rear portion 27b with respect to a cable. FIGURE 5 shows extension 21a and its secured connectors 27 aligned with axis A—A. FIGURE 6, showing a section taken on FIGURE 2 through portions 27b of the connectors, shows that the portions 27b of the connectors 27 have twisted counter clockwise with respect to axis A—A. Similarly, the portions 27b of connectors 27 fixed to extensions 20a have also shifted, a corresponding angle with respect to axis A—A. FIGURE 7 shows almost an end view of rear portions 27b of the connectors, since line 7—7 on FIGURE 2 is at the terminal ends of the connectors. FIGURE 7 shows portions 27b farther displaced with respect to axis A—A than in FIGURE 6, and also shows the increasing cross sectional area of the interior of each connector, that is, each connector has a diverging interior to permit the proper reception of a cable end 46. An emerging cable from its connector 27 at the section line 7—7 has been orbited so that it is free to resume its normal lay and twist relation with the other emerging cables. In other words, a rear portion 27b is so oriented that the end 46 of a cable is freely received within the connector, without bending or kinking the cable at the point of entry (or emergence) of the cable.

FIGURE 5a shows a slight modification; in lieu of a sheath or tube formation, a cruciform separator 51 is utilized at the bolting intersection. Opposite arcs are sliced away to allow the separation to straddle the extension element as far as possible, and wrapped with the waterproof cord.

FIGURE 8a shows a modification of the bearing 48. Bearing 51 is a cruciform cross section to separate the positive and negative cables, as shown in the figure. The bearing also has an aperture 52 for spring 44; and further has passages 53 to permit flow of coolant from aperture 52 to the cables.

FIGURES 9–12a are drawn to another embodiment of the invention. In this embodiment, positive conductor 54 of the terminal is separated from its mating negative conductor 55 by insulating block 37. The conductors are provided with elements 22, 23, 24, etc., as in the embodiment of FIGURES 1 to 8a, and the same characters designate the same elements in both embodiments. Only the variations from the first embodiment will be described, and reference should be made to the foregoing description for the rest of the structure.

Conductor 54 terminates with extension 56 having an angular surface 57 which mates with a similar angular surface 58 of extension 59a on connector 59. Conductor 55 and its connector 60 have similar cooperating angular surfaces 57 and 58 on extension 60a.

Connector 59 is constructed to connect two cables of the same polarity to conductor 54. As shown in FIGURE 1, connector 59 connects positive cables 64 to conductor 54. Similarly, connector 60 connects negative cables 63 to conductor 55.

As in the previous embodiment, connectors 59 and 60 are twisted or oriented to permit the cables to emerge therefrom, or enter therein, freely and matching the cable lay or helical twist of the cable assembly.

Each connector is bolted to its extension 56 by screws 61 passing through holes 62. Connector 59 is swaged or deformed beyond its surface 58 to a rectangular cross section to receive the ends of both cables 64 on opposite sides of the coolant conduit 66, as shown in FIGURES 12 and 12a. As shown in FIGURES 9 and 10, the ends of cables 64 extend into extensions 59a. Mechanical and electrical connections between the connector and the cables are made by compressing and swaging the connector around the cables and by the use of screws 61 entering the compacted cable strands.

Connector 60 is deformed by proper dies to form fluted recesses 60a which are connected to radial channel 60b.

The ends of cables 63 are inserted in connectors 60. The region of the connector past extension 60a is deformed into a U-shaped formation, straddling extension 59a, each side of the U embracing a cable 63, as shown in FIGURE 12.

As shown in FIGURES 12 and 12a connector 59 is shown twisted with respect to axis A—A and in FIGURE 12a in relation to its extensions 59a. The same applies to connector 60 in FIGURE 12. As pointed out above, the emerging (or entering) cables in FIGURE 12 from connectors 59 and 60 have orbited or twisted relative to their extensions 59a and 60a to match the helical lay of the cable assembly sheath 30 which separates connectors 59 and 60, as in the first embodiment.

To provide flow of coolant to the various portions of the cable assembly, tube 68 inserted in connector 60 forms a conduit 66 for coolant from channels 25 and 26 to the spring 44 and perforated tube 48. Channel 65 provides a flow path between the water channels and the space surrounding connector 59 (FIGURES 10 and 12). Radial channel 60b connects the coolant flow to flutes 60a to cool connector 60. Radial channel 67 is also connected to the coolant flow to cool connector 59 at that point.

To further cool the connector assembly, the side of extensions 56 taper from the shoulder or surfaces 41 abutting the connector ends to the end of the extension. Thus, a space 69 (FIGURE 11) is provided for cooling the extensions.

While there has been herein described preferred forms of the invention, it should be understood that the same may be altered or varied in details and in relative arrangement of parts within the scope of appended claims.

I claim:

1. A flexible cable welding assembly comprising: a terminal structure formed by two superimposed, mutually insulated conductor lugs of opposite polarity, one conductor lug terminating in a bifurcated end forming two extensions, the other conductor lug terminating in a single central extension located between said two extensions; a cable assembly consisting of four helically twisted cables of opposite polarity; a tubular connector for each cable having a conductor lug attaching front portion and a cable receiving rear portion, the rear portion being angularly offset from the front portion and twisted to match the helical twist of said cables to freely receive an end of a cable without kniking and bending; and means for securing a first connector connected to a cable of one polarity to one of said two extensions, a second connector connected to a cable of like polarity to the other of said two extensions, and third and fourth connectors connected to the other two cables of opposite polarity to said single central extension.

2. A flexible cable welding assembly in accordance with claim 1 wherein a surface on each extension extends from and is at right angles with a surface on its conductor lug, each of said connectors being located on and secured to said extension surface, and each connector having a front squared end abutting said surface on the conductor lug.

3. A flexible cable welding assembly in accordance with claim 2, wherein a solid insert fills the front portion of each tubular connector and said securing means comprises a threaded fastener passing through said front portion and said insert which is threaded into the extension.

4. A flexible cable welding assembly comprising: a terminal structure formed by two superimposed, mutually insulated conductor lugs of opposite polarity, each conductor lug having a terminal extension; a cable assembly consisting of a plurality of helically twisted cable means of opposite polarity, a hollow connector having a conductor lug attaching front portion and a cable means receiving rear portion, the rear portion being angularly offset from the front portion and twisted to match the helical twist of said cable means to freely receive said cable means without kinking and bending the same; means for securing one connector to one of said terminal extensions; the rear portion of said one connector being of rectangular cross section and receiving a plurality of cable means of the same polarity; and means for securing another hollow connector to the other terminal extension; the rear portion of said other connector being of U-shaped cross section with tubular sides straddling the rear portion of said one connector, each tubular side receiving an equal number of cable means of the opposite polarity.

5. A flexible cable welding assembly in accordance with claim 4, wherein the cable assembly is of the four-cable type, two cables of one polarity being connected to the first connector, a third cable of the other polarity being connected to one side of the rear portion of the other connector and the fourth cable of the other polarity being connected to the other side of the rear portion of the other connector.

6. A flexible cable welding assembly comprising: a terminal structure formed by two superimposed, mutually insulated conductor lugs of opposite polarity; a cable assembly consisting of a plurality of helically twisted cable means of opposite polarity, hollow connector means having a conductor lug attaching front portion and a cable means receiving rear portion, the rear portion being angularly offset from the front portion and twisted to match the helical twist of said cable means to freely receive said cable means without kinking and bending the same; means to secure the front portion of a connector means to a conductor lug and the rear portion to a plurality of cable means of the same polarity; and means to secure the front portion of another connector means to the other conductor lug and the rear portion to the rope means of the opposite polarity, and a plastic bearing sleeve encompasing said connectors at their rear portions and the adjacent cable means extending from said rear portions.

References Cited

UNITED STATES PATENTS

| 3,333,044 | 7/1967 | Toto | 174—15 |
| 2,835,721 | 5/1958 | Leathers | 174—15 |
| 3,065,290 | 11/1962 | Grove | 174—15 |

LEWIS H. MYERS, Primary Examiner

A. T. GRIMLEY, Assistant Examiner

U.S. Cl. X.R.

174—19, 99; 339—15, 112